US006986211B2

(12) United States Patent
Gunderson

(10) Patent No.: US 6,986,211 B2
(45) Date of Patent: Jan. 17, 2006

(54) SYSTEM AND METHOD OF PLANAR POSITIONING

(75) Inventor: Gary M. Gunderson, Issaquah, WA (US)

(73) Assignee: Applied Precision, LLC, Issaquah, WA (US)

( * ) Notice: Subject to any disclaimer, the term of this patent is extended or adjusted under 35 U.S.C. 154(b) by 0 days.

(21) Appl. No.: 10/801,925

(22) Filed: Mar. 15, 2004

(65) Prior Publication Data

US 2005/0011080 A1 Jan. 20, 2005

Related U.S. Application Data

(60) Provisional application No. 60/454,559, filed on Mar. 14, 2003.

(51) Int. Cl.
*G01B 5/25* (2006.01)

(52) U.S. Cl. ........................................................ 33/645

(58) Field of Classification Search .................. 33/613, 33/645, 568, 1 M, 503, 556
See application file for complete search history.

(56) References Cited

U.S. PATENT DOCUMENTS

| | | | | |
|---|---|---|---|---|
| 3,926,062 | A * | 12/1975 | Neff | 33/711 |
| 4,575,942 | A * | 3/1986 | Moriyama | 33/1 M |
| 5,870,834 | A * | 2/1999 | Sheldon | 33/556 |
| 6,260,428 | B1 * | 7/2001 | Clement | 33/568 |
| 6,320,372 | B1 | 11/2001 | Keller | 324/158.1 |
| 6,397,481 | B1 * | 6/2002 | Alvarez et al. | 33/1 M |
| 6,420,892 | B1 | 7/2002 | Krivy | 324/758 |
| 6,515,494 | B1 | 2/2003 | Low | 324/318 |
| 6,662,462 | B2 * | 12/2003 | Ruijl | 33/704 |
| 6,808,344 | B2 * | 10/2004 | Chen | 409/201 |
| 6,819,425 | B2 * | 11/2004 | Kwan | 356/399 |
| 2004/0126198 | A1 * | 7/2004 | Chen | 409/201 |
| 2004/0263108 | A1 * | 12/2004 | Lim et al. | 33/568 |

FOREIGN PATENT DOCUMENTS

| | | |
|---|---|---|
| JP | 03-177039 | 10/1999 |

* cited by examiner

*Primary Examiner*—G. Bradley Bennett
(74) *Attorney, Agent, or Firm*—Pillsbury Winthrop Shaw Pittman LLP

(57) ABSTRACT

A system and method of controlling the relationship between two surfaces (such as a primary surface and a reference surface) and correcting any deviation from the desired or ideal relationship generally employ a plurality of actuators and flexural assemblies. The actuators may be driven in unison to translate the primary surface in one-dimension; the actuators may also be driven independently, accommodating fine adjustment in pitch, roll, or both, of the primary surface. Flexural assemblies may be implemented to minimize lateral cross-coupling between the linear actuators.

17 Claims, 4 Drawing Sheets

SYSTEM AND METHOD OF PLANAR POSITIONING

CROSS-REFERENCE TO RELATED APPLICATIONS

The present application claims the benefit of U.S. provisional application Ser. No. 60/454,559, filed Mar. 14, 2003, entitled "METHOD OF PLANAR POSITIONING," the disclosure of which is hereby incorporated herein by reference in its entirety.

FIELD OF THE INVENTION

Aspects of the present invention relate generally to the field of accurately placing one surface with respect to another, and more particularly to a system and method of determining angular deviation from parallel between two surfaces and correcting such deviation.

BACKGROUND OF THE INVENTION

In probe card metrology applications, it is often necessary or desirable to know the distance between a flat surface (a "primary" or "principal" surface) and another surface to which a probe card is attached ("reference" surface). A common approach employed by many systems is illustrated in FIG. 1. Specifically, FIG. 1 is a simplified diagram illustrating three views of the structural components employed in a typical probe card metrology system. Platforms A and B are connected or rigidly affixed by three or more legs or vertical structural members; the platforms and the legs form a metrology frame to which other components of the metrology system may be attached during use. A z-stage, such as the exemplary wedge driven z-stage, for example, is attached to platform A. The primary surface is typically attached to the top of this stage, while a reference ring or other structural reference component is attached to the bottom side of platform B. Where a ring is used, the top surface of the reference ring is typically designated as the reference plane, and ordinarily supports a probe card to be analyzed. Through linear horizontal translation of wedge C, wedge D may be driven vertically, thereby translating the primary surface relative to the reference surface. In that regard, a linear scale or encoder (labeled "linear encoder" in FIG. 1) may measure displacement of wedge D relative to platform A.

The lower travel limit of the z-stage may be measured (relative to the reference surface) using a depth indicator, for example, as illustrated in FIG. 2. Specifically, FIG. 2 is a simplified diagram illustrating three views of the structural components employed in a probe card metrology system adapted for use with a depth indicator. Such a depth indicator is typically set in a flat bar spanning the reference ring. By first zeroing or calibrating the depth indicator flush with the flat bar, absolute depth of the primary surface can be measured. Similarly, relocating the depth indicator and taking measurements at three points on the primary surface may allow parallelism to be determined. Any non-parallelism may be removed, for example, by adjusting the pitch, roll, or both, of either the z-stage base, platform A, platform B, or some combination thereof. In the embodiment illustrated in FIGS. 1 and 2, the linear encoder is attached between wedge D and platform A; as noted briefly above, this linear encoder may measure displacement of the wedge relative to the platform. Since the starting height is known from the depth indicator measurements, such measurement of the displacement may allow the final height to be determined.

The Abbe principle dictates, however, that displacement at points away from the linear encoder can only be inferred. Any compression or deflection of components above the linear encoder (such as platform B), for example, is not measured, nor is any deflection or deformation of the reference or primary surfaces, such as due to forces exerted by probes during overtravel. Additionally, current technology can provide no information regarding parallelism degradation. Since only one linear encoder is provided, angular displacement cannot be measured absent complicated and time-consuming relocation of the depth indicator and recalibration. Any dimensional changes to the stiffness loop due to temperature or strain, for example, are typically not considered, and can influence measurement results.

In other words, a displacement of 10 μm as measured by the linear encoder in a conventional system does not guarantee uniform, one-dimensional translation of the principal plane relative to the probe card of that 10 μm distance. In that regard, measurement accuracy is a function of the rigidity of the structural components of the system, the trueness of stage travel, the stability of the metrology frame, and other factors which are not taken into account by conventional metrology methods and technologies.

SUMMARY

Aspects of the present invention overcome the foregoing and other shortcomings of conventional technology, providing a system and method of controlling the relationship between two surfaces and correcting any deviation from the desired or ideal relationship. Exemplary systems and methods may generally comprise a plurality of linear actuators which may be driven in unison or independently.

In accordance with one embodiment, for example, a method of controlling the relationship between a primary surface and a reference surface in a probe card analysis system may comprise: defining the reference surface at a selected point on a metrology frame; attaching a plurality of linear actuators to the metrology frame; coupling a platform supporting the primary surface to each of the plurality of linear actuators; and controlling the relationship between the primary surface and the reference surface utilizing the plurality of linear actuators. In some exemplary embodiments, the coupling comprises utilizing a flexural assembly between the platform and each of the plurality of linear actuators.

For linear motion, the controlling comprises driving each of the plurality of linear actuators in unison; for pitch and roll control, for example, the controlling comprises driving one of the plurality of linear actuators independently. In that regard, methods are set forth herein wherein the controlling comprises dynamically controlling an angular orientation between the primary surface and the reference surface, and wherein the controlling comprises dynamically compensating for changes in shape of structural elements of the metrology system, such as a probe card analysis system, for example. In accordance with the present disclosure, the controlling generally comprises determining a distance between the primary surface and the reference surface at one or more selected locations on the platform supporting the primary surface; such determining may comprise utilizing a linear encoder at the one or more selected locations, and the controlling may additionally comprise feeding distance information back to the plurality of linear actuators.

In accordance with another exemplary embodiment, a metrology system may comprise: a metrology frame having one or more vertical structural members; a plurality of linear actuators attached to the frame; and a platform supporting a primary surface; wherein the platform is coupled to each of the plurality of linear actuators. As with the method noted above, one system may comprise a respective flexural assembly attached to each of the plurality of linear actuators and coupling a respective linear actuator to the platform. In particular, each respective flexural assembly may be operative to minimize lateral cross-coupling between the plurality of linear actuators.

A metrology system as set forth in detail below may further comprise a respective linear encoder associated with each of the plurality of linear actuators. Each respective linear encoder is generally operative to acquire distance information representing a distance between the primary surface and a reference surface. The plurality of linear actuators may be driven in unison responsive to the distance information; alternatively, one of the plurality of linear actuators may driven independently responsive to the distance information.

In one embodiment, each of the plurality of linear actuators is attached to a respective one of the one or more vertical structural members of the frame.

The foregoing and other aspects of the disclosed embodiments will be more fully understood through examination of the following detailed description thereof in conjunction with the drawing figures.

DETAILED DESCRIPTION

As set forth in more detail below, a metrology system and method are disclosed which enable the coplanarity of the primary surface and the reference surface to be controlled by a plurality of actuators; in some instances, flexural assemblies supporting the reference surface (i.e., coupling the reference surface and the actuators) may minimize lateral cross-coupling between the plurality of actuators. In particular, the actuators may be used dynamically to compensate for changes (e.g., in shape or orientation) of the reference surface or of the metrology frame due to environmental changes such as temperature; compensation in this context may include compensating for relative pitch, roll, or both between the reference surface and the primary surface. It will be appreciated that a system and method configured and operative in accordance with the present disclosure enable the actuators to stabilize the positioning of the primary surface relative to the reference surface even under dynamic loading conditions.

Figure 1:
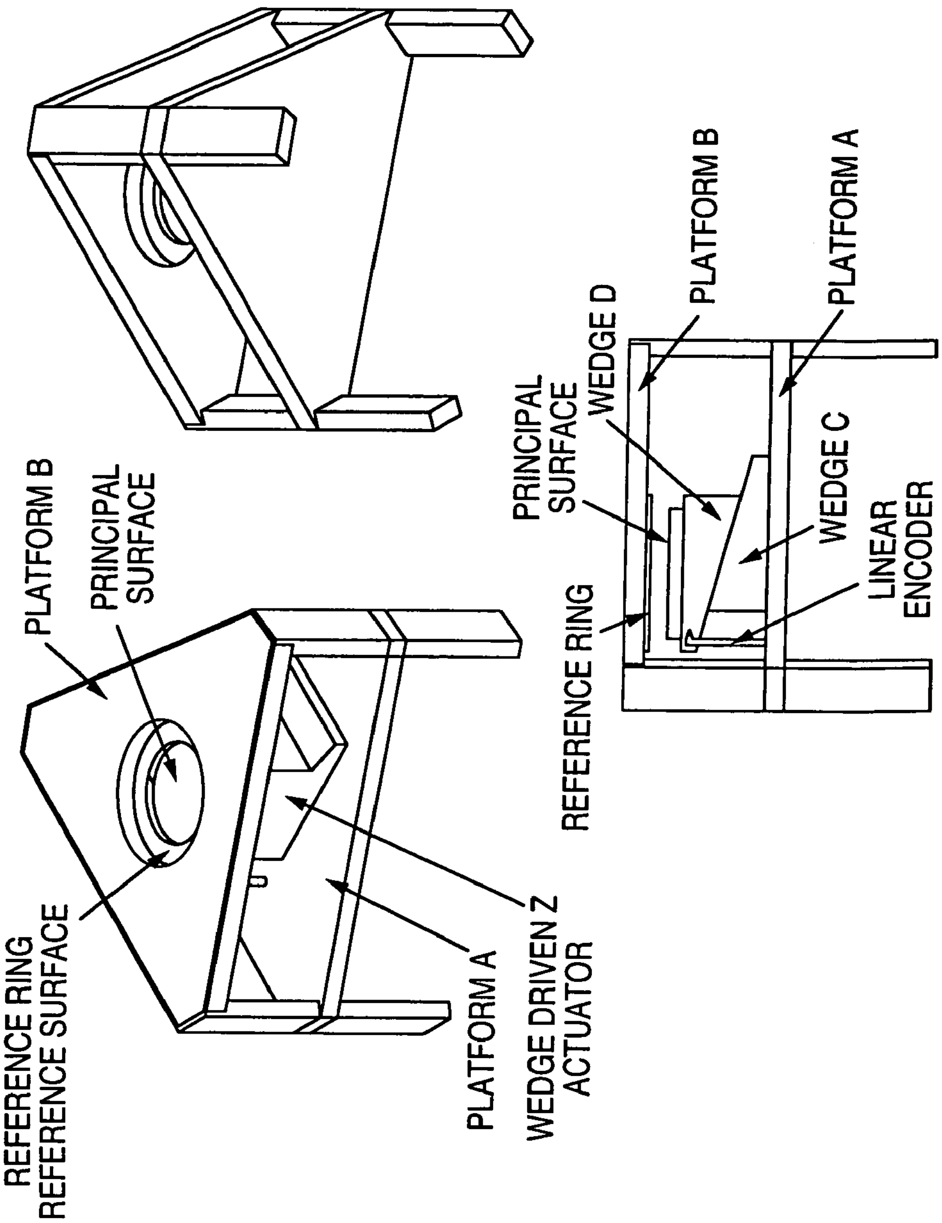
FIG. 1 is a simplified diagram illustrating three views of the structural components employed in a typical probe card metrology system.
Figure 2:
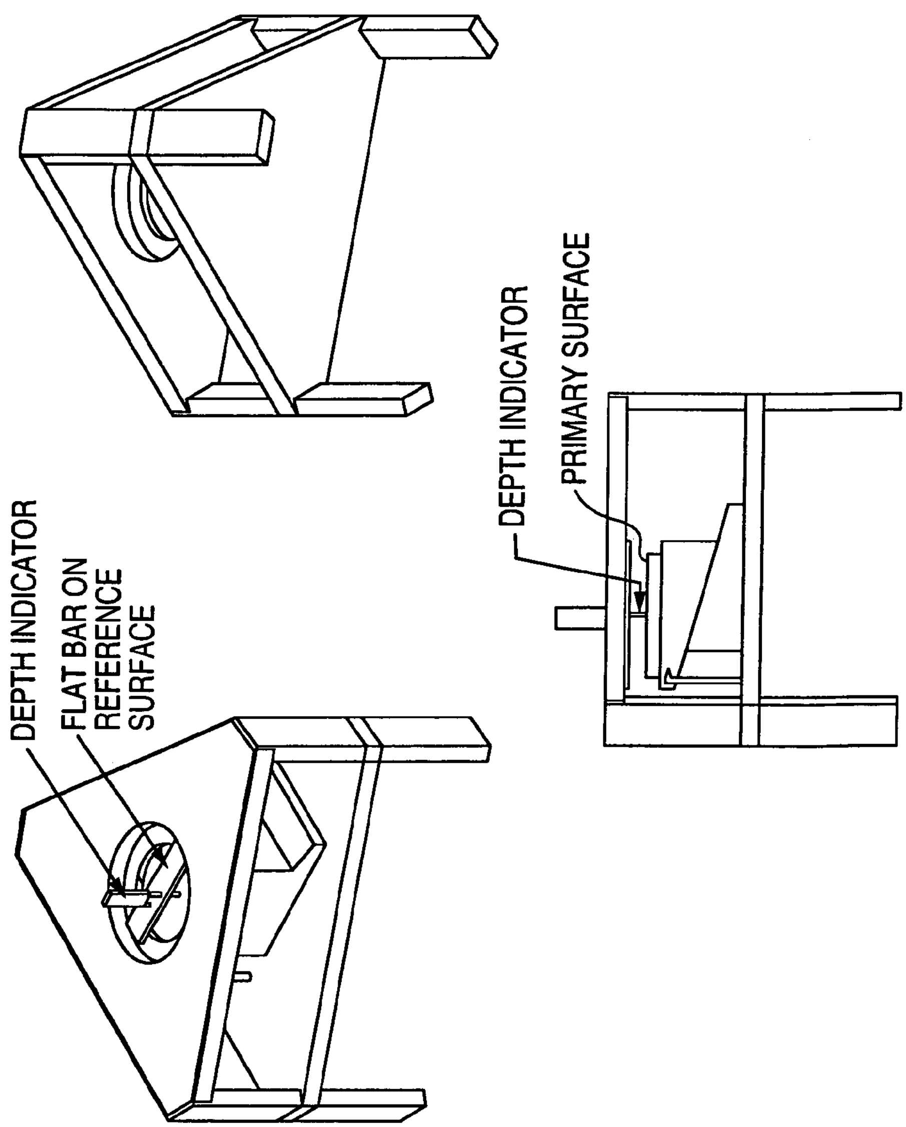
FIG. 2 is a simplified diagram illustrating three views of the structural components employed in a probe card metrology system adapted for use with a depth indicator.
Figure 3:
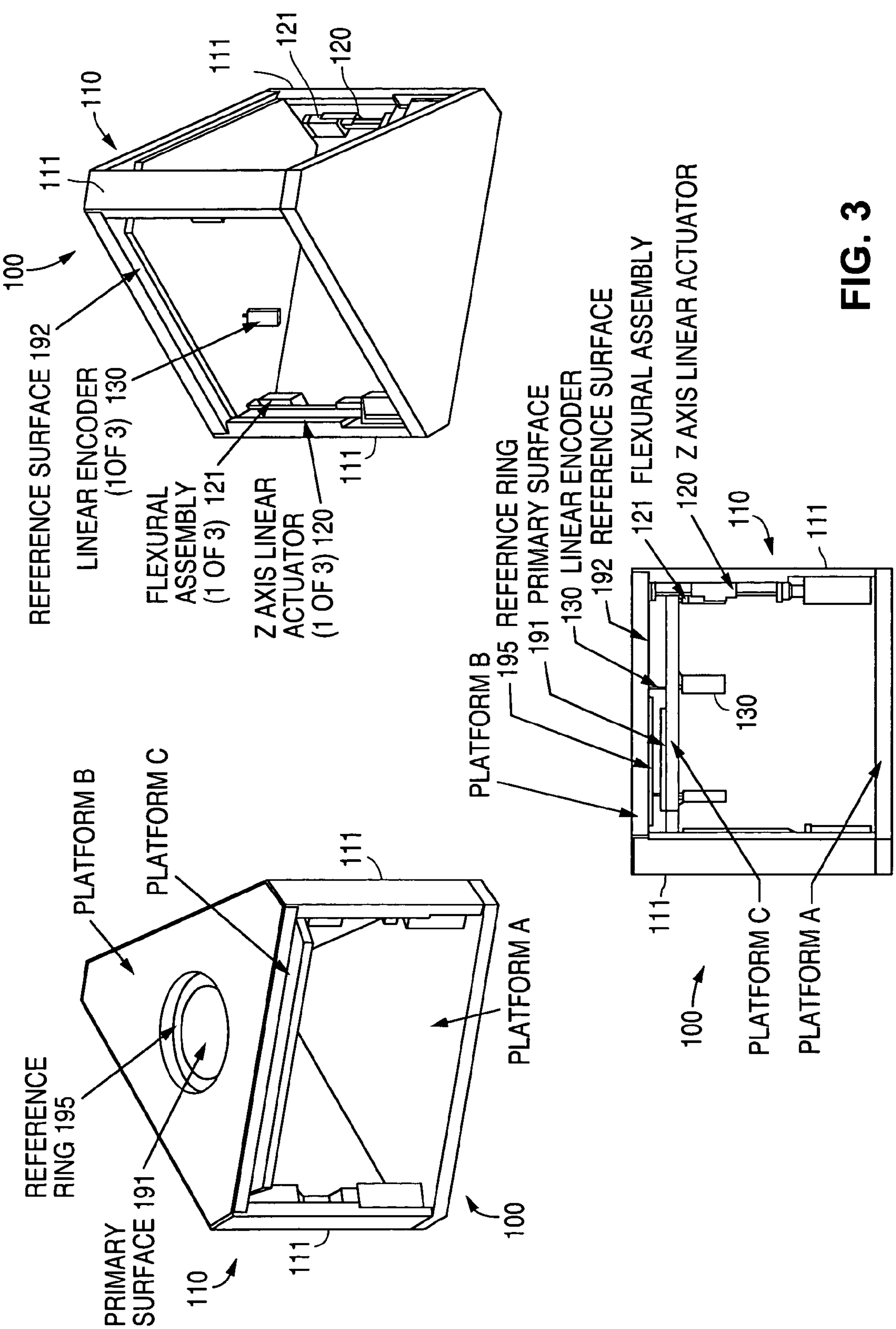
FIG. 3 is a simplified diagram illustrating three views of one embodiment of a metrology system constructed and operative in accordance with the present disclosure.
Figure 4:
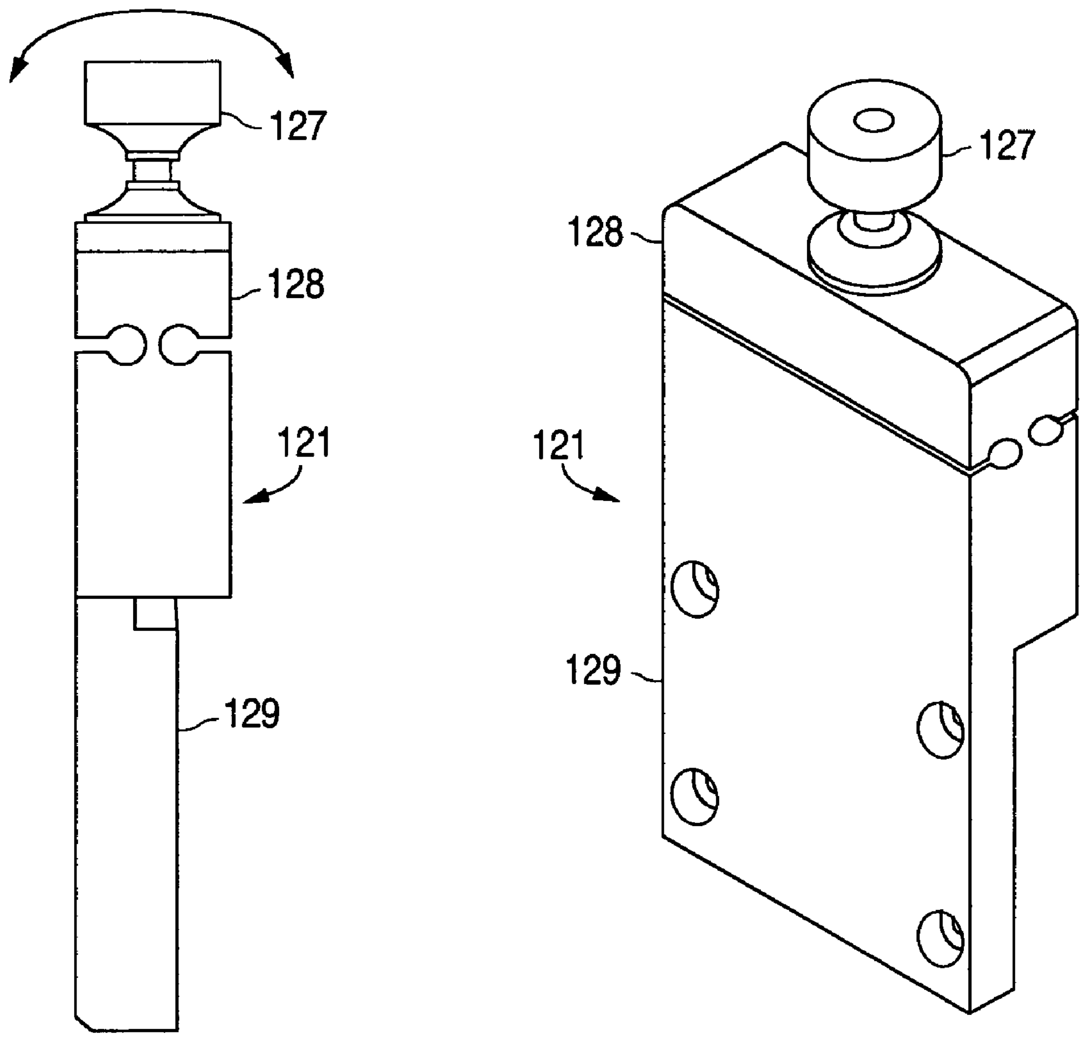
FIG. 4 is a simplified diagram illustrating two views of a flexural assembly constructed and operative in accordance with the present disclosure.

With specific reference now to FIGS. 3 and 4, it is noted that FIG. 3 is a simplified diagram illustrating three views of one embodiment of a metrology system, and FIG. 4 is a simplified diagram illustrating two views of a flexural assembly, both of which are constructed and operative in accordance with the present disclosure. The system is generally indicated at reference numeral 100. In the exemplary FIG. 3 embodiment in which the metrology frame 110 comprises three legs or vertical structural elements 111, three linear actuators 120 may be employed; in that regard, a respective linear actuator 120 may be mounted to, attached to, associated with, or otherwise deployed with respect to each respective vertical structural element 111 of a metrology frame 110.

It is noted that the following description of system 100 employing three vertical structural elements 111 is provided by way of example only, and for the sake of clarity. While three vertical structural elements 111 and respective actuators 120 may provide a stable frame 110 and enable acceptable positioning characteristics and functionality as set forth below, other embodiments of system 100 employing fewer or more vertical structural elements 111 are also contemplated herein, and may have utility in various applications.

Linear actuators 120 may be embodied in or comprise any of various types of linear actuator mechanisms, including, but not limited to, those employing or characterized by worm gears, racks and pinions, bellows driven linear translation devices, and the like. In the FIG. 3 embodiment, linear actuators 120 may be rigidly attached to (or otherwise maintained in a fixed relationship with respect to) the metrology framework in general, and vertical structural elements 111, in particular. By way of example, and as implemented in the FIG. 3 embodiment, linear actuators 120 may also be supported at the top and bottom by platforms B and A, respectively. Each respective linear actuator 120 may comprise, incorporate, or be associated with a respective flexural assembly 121 (FIG. 4). In one exemplary implementation, a respective flexural assembly 121 may be attached to, for example, or incorporated into the structure of, the carriage or other structural component of each respective linear actuator 120. A third platform C may then be attached to, supported by, or otherwise coupled to these flexural assemblies 121.

In that regard, and with specific reference to FIG. 4, flexural assemblies 121 may be employed to couple linear actuators 120 to platform C on which primary surface 191 is disposed and to minimize lateral cross-coupling between linear actuators 120. Each respective flexural assembly 121 may generally comprise a fixed portion 129 and a flexural portion 128. In the FIG. 4 embodiment, fixed portion 129 may be fixedly or rigidly attached to a respective actuator 120; alternatively, flexural assembly 121 may be integrated into the structure of linear actuator 120 as set forth above. Flexural portion 128 may be configured and operative to couple platform C to linear actuator 120 through fixed portion 129, and may include one or more projections, knobs, protuberances, or other platform attachment structures 127 for that purpose. Platform attachment structure 127 may be inserted into or coupled with a cooperating structure on platform C, enabling flexural assembly 121 both to support platform C and to couple platform C to linear actuator 120.

It will be appreciated that the structural characteristics of flexural assembly 121 are susceptible of numerous variations depending, for example, upon the degree of integration between flexural assembly 121 and linear actuator 120, the structure of platform C, the type of constraints and degrees of freedom desired for platform C (which may be application specific), and other factors.

As set forth above, an exemplary metrology system 100 for use in probe card analysis operations and other applications may generally comprise: a first platform A and a second platform B rigidly attached by vertical structural members 111 to form a metrology frame 110; a plurality of linear actuators 120, each of which may be affixed or attached to (or incorporated or otherwise integrated into the structure of) a respective vertical structural member 111; a respective flexural assembly 121 affixed or attached to (or incorporated or otherwise integrated into the structure of) each respective linear actuator 120; and a third platform C coupled to each respective linear actuator 120. In some instances, the third platform may be supported by each respective flexural assembly 121.

The primary surface 191 may be bonded or otherwise attached to platform C. In some embodiments, one or more linear encoders 130 may be set into or disposed on platform C with tips protruding upward, for example, accurately to determine a distance between primary surface 191 and a reference surface 192 at one or more selected locations on platform C. In the structural arrangement depicted in FIG. 3, the bottom side of the platform B (i.e., the surface proximal to platform C) may be designated as reference plane 192; it will be appreciated that some other surface may be so designated, depending upon the structural configuration of the various components, the specific application for which system 100 may be employed, and other factors. It may be desirable to attach a reference ring 195 or similar reference structural element to the foregoing bottom side of platform B, since in this implementation, the reference surface of the ring 195 (upon which a probe card may be supported during metrology applications) may be coplanar with reference surface 192 of platform B.

Each respective linear encoder 130 described above may be zeroed to primary surface 191, for example, with a straightedge, a laser, or other appropriate guide and calibration mechanism. When platform C is translated toward platform B during operation, encoders 130 may contact reference surface 192; accordingly, each respective encoder 130 may read the exact distance between primary surface 191 and reference surface 192. Feedback from encoders 130 to actuators 120 may allow for accurate positioning of primary surface 191 with respect to reference surface 192.

Driving linear actuators 120 in unison generally causes primary surface 191 to translate in one-dimension (i.e., the z direction), while driving linear actuators 120 independently may accommodate fine adjustment in pitch, roll, or both, of primary surface 191. Flexural assemblies 121 may allow unconstrained movement of actuators 120 over small angular displacements when actuators 120 are driven independently, yet provide fully constrained support of platform C and primary surface 191 disposed or supported thereon.

Those of skill in the art will appreciate that the foregoing structural arrangement and its equivalents may enable significant reduction or elimination of the Abbe error. For example, since encoders 130 directly measure the distance between primary surface 191 and reference surface 192, the only contributors to Abbe error are those affecting the deflection of platforms B or C (or of primary surface 191 disposed thereon) inbound of encoders 130. In that regard, if the second platform B deforms (e.g., deflects upward from the force of overtraveled probes), the foregoing implementation may not account for such deformation. The same may be true for deflections downward, or for other deformations, of platform C or of primary surface 191. Such deflections may be reduced or minimized, however, to an acceptable level by stiffening those areas.

Conventional systems, even if designed to measure parallelism shifts, cannot correct such shifts in real time. The exemplary embodiment illustrated and described herein, however, provides a rigid platform that is compliant for pitch and roll shifts through the use of flexural assemblies 121. In the case of a deflection or deformation of frame 110, for example, due to strain or temperature effects, linear encoders 130 may identify the effects of such a deformation and feed appropriate information back to actuators 120; accordingly, the design allows for stable positioning of primary surface 191 relative to reference surface 192 even under dynamic loading conditions.

Aspects of the present invention have been illustrated and described in detail with reference to particular embodiments by way of example only, and not by way of limitation. It will be appreciated that various modifications and alterations may be made to the exemplary embodiments without departing from the scope and contemplation of the present disclosure. It is intended, therefore, that the invention be considered as limited only by the scope of the appended claims

What is claimed is:

1. A method of controlling the relationship between a primary surface and a reference surface in a probe card analysis system; said method comprising:

defining said reference surface at a selected point on a metrology frame;

attaching at least three linear actuators rigidly to said metrology frame such that the at least three linear actuators are parallel but not in the same plane;

coupling a platform supporting said primary surface to each of said at least three linear actuators; and controlling the relationship between said primary surface and said reference surface utilizing said at least three linear actuators with feedback from the at least three linear linear actuators.

2. The method of claim 1 wherein said coupling comprises utilizing a flexural assembly between said platform and each of said at least three of linear actuators.

3. The method of claim 1 wherein said controlling comprises driving each of said at least three linear actuators in unison.

4. The method of claim 1 wherein said controlling comprises driving one of said at least three linear actuators independently.

5. The method of claim 4 wherein said controlling comprises dynamically controlling an angular orientation between said primary surface and said reference surface.

6. The method of claim 4 wherein said controlling comprises dynamically compensating for changes in shape of structural elements of said probe card analysis system.

7. The method of claim 1 wherein said controlling comprises determining a distance between said primary surface and said reference surface at one or more selected locations on said platform.

8. The method of claim 7 wherein said determining comprises utilizing a linear encoder at said one or more selected locations.

9. The method of claim 8 wherein said controlling further comprises feeding distance information back to said at least three linear actuators responsive to said determining.

10. A metrology system comprising:

a metrology frame having one or more vertical structural members;

at least three linear actuators attached to said frame such that the at least three linear actuators are parallel but not in the same plane; and a platform supporting a primary surface; said platform coupled to each of said at least three linear actuators with feedback from the at least three linear linear actuators.

11. The metrology system of claim 10 further comprising:

a respective flexural assembly attached to each of said at least three linear actuators and coupling a respective linear actuator to said platform.

12. The metrology system of claim 11 wherein each said respective flexural assembly is operative to minimize lateral cross-coupling between said at least three linear actuators.

13. The metrology system of claim 10 further comprising a respective linear encoder associated with each of said at least three linear actuators.

14. The metrology system of claim 13 wherein each respective linear encoder is operative to acquire distance information representing a distance between said primary surface and a reference surface at a selected location on said platform.

15. The metrology system of claim 14 wherein each of said at least three linear actuators is driven in unison responsive to said distance information.

16. The metrology system of claim 14 wherein one of said at least three linear actuators is driven independently responsive to said distance information.

17. The metrology system of claim 10 wherein each of said at least three linear actuators is attached to a respective one of said one or more vertical structural members.

* * * * *